US006202856B1

(12) United States Patent
Carr

(10) Patent No.: US 6,202,856 B1
(45) Date of Patent: Mar. 20, 2001

(54) VIBRATORY SCREENING SYSTEM AND SCREEN THEREFOR

(75) Inventor: Brian S. Carr, Independence, KY (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/401,425

(22) Filed: Sep. 22, 1999

(51) Int. Cl.$^7$ ........................................................... B07B 1/49
(52) U.S. Cl. ........................ 209/401; 209/403; 209/397; 209/399; 209/315; 209/311; 209/409
(58) Field of Search ...................................... 209/401, 403, 209/397, 399, 315, 311, 409

(56) References Cited

U.S. PATENT DOCUMENTS

| | | | |
|---|---|---|---|
| 2,455,383 | 12/1948 | Pickard | 209/323 |
| 3,057,481 | * 10/1962 | Pall | 210/493 |
| 3,214,314 | 10/1965 | Rowbottam | 156/160 |
| 3,261,469 | 7/1966 | Wehner | 209/325 |
| 3,980,555 | * 9/1976 | Freissle | 209/408 |
| 4,028,230 | 6/1977 | Rosenblum | 209/403 |
| 4,526,682 | 7/1985 | Wallace | 209/337 |
| 4,575,421 | * 3/1986 | Derrick et al. | 209/397 |
| 4,696,751 | * 9/1987 | Eifling | 210/780 |
| 4,728,422 | 3/1988 | Bailey | 210/314 |
| 4,762,610 | 8/1988 | Freissle | 210/499 |
| 4,832,834 | * 5/1989 | Baird, Jr. | 209/397 |
| 4,857,176 | * 8/1989 | Derrick et al. | 209/392 |
| 4,861,462 | 8/1989 | Lehmann et al. | 209/269 |
| 5,039,412 | 8/1991 | Marsh | 210/488 |
| 5,047,148 | 9/1991 | Arai | 210/499 |
| 5,221,008 | * 6/1993 | Derrick et al. | 209/269 |
| 5,330,057 | * 7/1994 | Schiller et al. | 209/392 |
| 5,385,669 | 1/1995 | Leone, Sr. | 210/488 |
| 5,417,793 | * 5/1995 | Bakula | 156/308.2 |
| 5,417,858 | * 5/1995 | Derrick et al. | 210/388 |
| 5,417,859 | * 5/1995 | Bakula | 210/499 |
| 5,587,077 | 12/1996 | Aaltonen et al. | 210/499 |
| 5,636,749 | * 6/1997 | Wojciechowski | 209/403 |
| 5,720,881 | * 2/1998 | Derrick et al. | 210/388 |
| 5,744,036 | * 4/1998 | Choi | 210/493.5 |
| 5,783,077 | * 7/1998 | Bakula | 210/388 |
| 5,814,218 | 9/1998 | Cagle | 210/388 |
| 5,819,952 | * 10/1998 | Cook et al. | 209/400 |
| 5,851,393 | * 12/1998 | Carr et al. | 210/489 |
| 5,868,929 | * 2/1999 | Derrick et al. | 210/388 |
| 5,876,552 | * 3/1999 | Bakula | 156/308.2 |
| 5,944,993 | * 8/1999 | Derrick et al. | 271/388 |
| 5,958,236 | * 9/1999 | Bakula | 210/388 |
| 6,000,556 | * 12/1999 | Bakula | 210/388 |
| 6,053,332 | * 4/2000 | Bakula | 210/388 |

FOREIGN PATENT DOCUMENTS

| | | |
|---|---|---|
| 31 14573 C2 | 4/1987 | (DE) . |
| WO 94/15723 | 7/1994 | (WO) . |
| WO 94/23849 | 10/1994 | (WO) . |

* cited by examiner

*Primary Examiner*—Donald P. Walsh
*Assistant Examiner*—David Jones
(74) *Attorney, Agent, or Firm*—Lyon & Lyon LLP

(57) ABSTRACT

A screen having a frame, three screen cloth layers and a laminating solidified layer with perforations therethrough. The screening layer of the screen cloth is typically of the finest mesh with increasing coarseness to the support mesh. The solidified layer is positioned by placement on the supporting mesh where it is fused to impregnate through each of the screen layers to form surfaces on either side of the lamination. A heat press is employed to so configure the solidified layer. A nonstick sheet between the screening mesh and the heat press molds texture into the surface of the solidified layer for reduced slippage of material being screened on the assembly. The screen lamination is stretched and bonded to a screen frame.

14 Claims, 3 Drawing Sheets

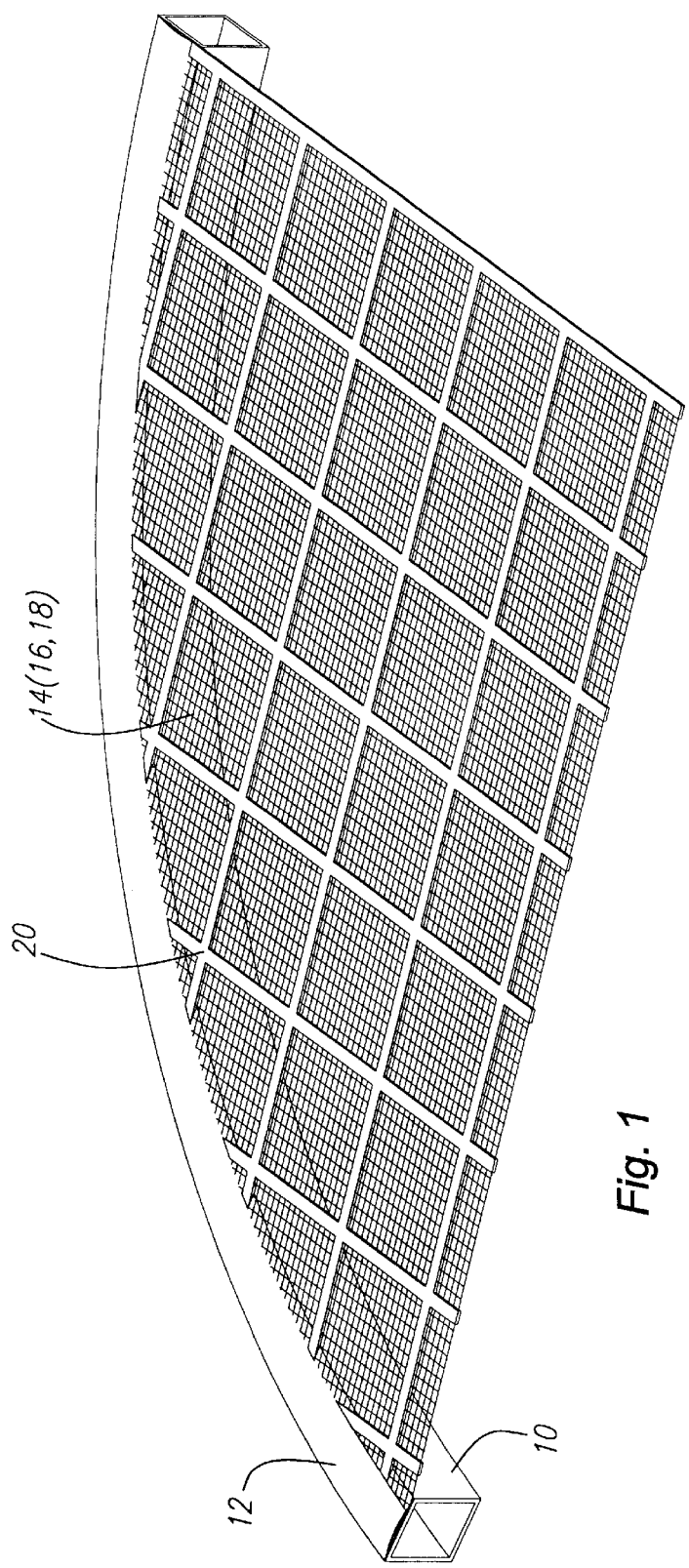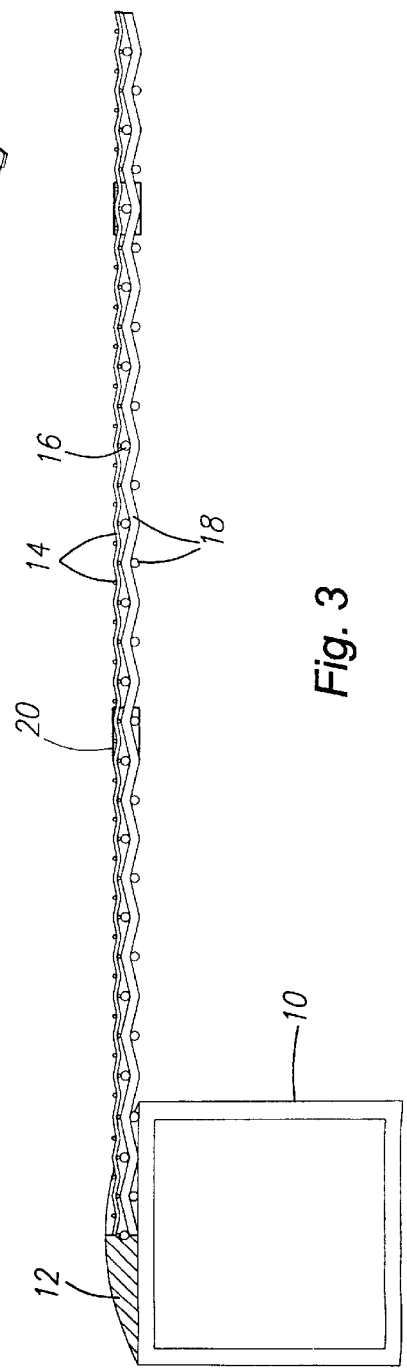

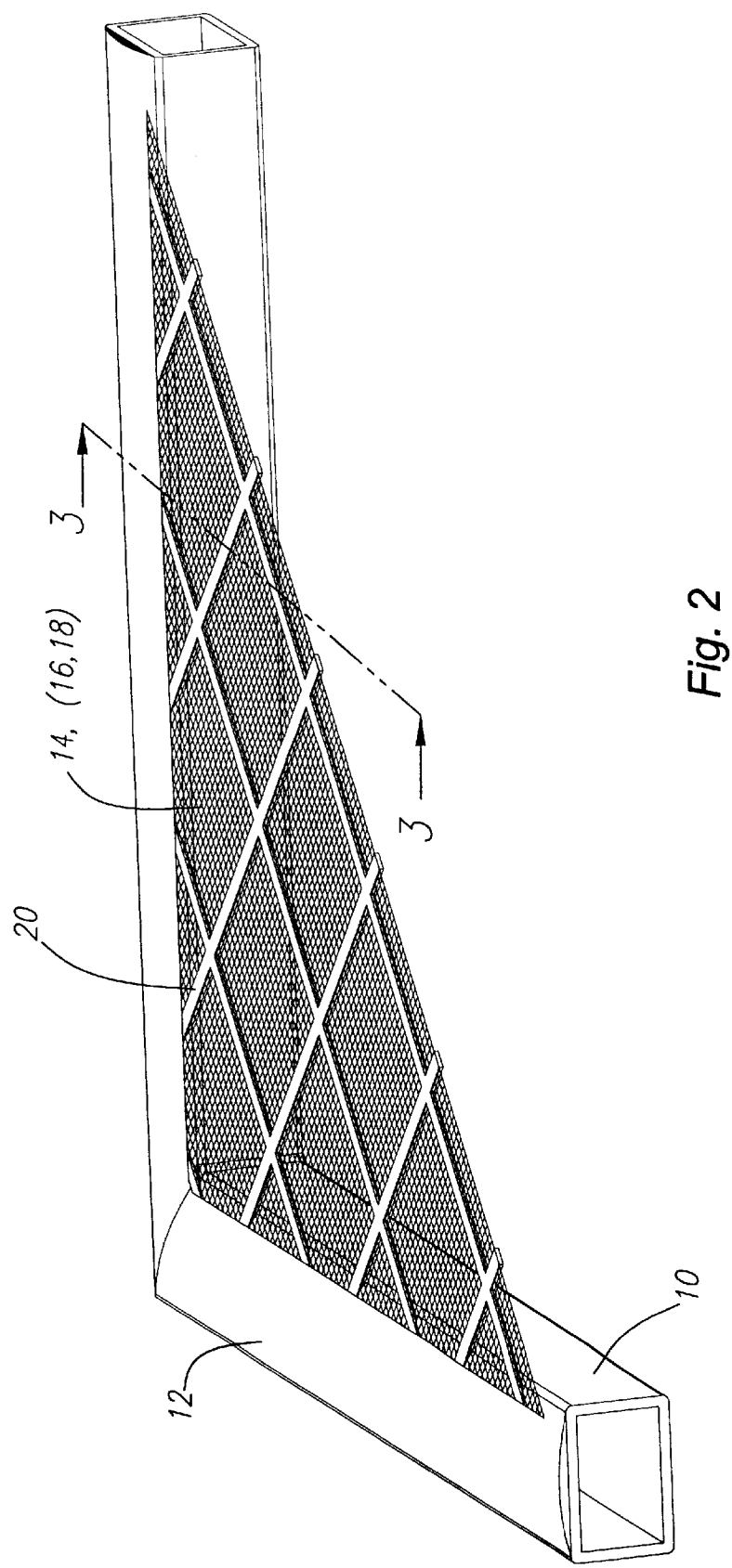

VIBRATORY SCREENING SYSTEM AND SCREEN THEREFOR

The field of the present invention is screening systems employing vibrational energy, the screens thereof and their manufacture.

BACKGROUND OF THE INVENTION

Vibratory screen systems have long been employed in both circular and rectangular form. The devices typically include a resiliently mounted housing having a screen extending across the housing. A vibration generating drive is coupled with the housing to vibrate the screen in an advantageous manner to increase screening efficiency. The screens are either self-contained by including screen cloth tensioned and bonded to a frame or rely on mechanisms on the resiliently mounted housing for placement and tensioning. In the latter circumstance, the screen typically includes screen cloth to which may be mounted hooks or eyes for attachment of tensioning mechanisms associated with the housing.

Alternatively, screens can include a perforated plate with screen cloth bonded thereto. When a plate is used, the screen may be tensioned before bonding to the plate. The screen cloth may be bonded to the plate by a layer of epoxy or thermoplastic material. The bonding material is positioned on the plate and the screen tensioned thereover. The material is then treated, commonly by heating to either initiate curing of the epoxy or fusing of the thermoplastic material. Nonstick layers of Teflon sheet may be employed where the assembly is compressed during the curing or fusing step. Multiple layers of screen cloth are known to be used in such assemblies.

Screens which employ hooks or eyes for tensioning by a separate mechanism have also been known which include laminated layers. A bonding by spot welding, epoxy or fusible material are known. Further, fusing multiple layers of screen cloth into the top of a frame structure made of fusible material having a peripheral frame and a pattern of open cells defined by cell walls has been done. The multiple screen cloths are bonded to the frame and to the cell walls by fusing the frame structure and resolidifying it after impregnation through the screen cloth or cloths. Such a structure is disclosed in U.S. Pat. No. 5,851,393, the disclosure of which is incorporated herein by reference.

Where bonding and laminating occurs in such a manner that the bonding or laminating material passes through the screen cloth or screen cloths to form a surface at the screening surface of the screen, a smooth surface results. The screen cloth often transports the material to be screened in a desired pattern. These smooth surfaces allow the material being screened to slip rather than transport the material and the overall transport of the material is inhibited.

SUMMARY OF THE INVENTION

The present invention is directed to a screen having two or more porous layers with at least one of those layers being a screen cloth and a solidified layer having perforations therethrough with the solidified layer impregnating the screen cloth to provide a first surface on one side of the screen.

In a first separate aspect of the present invention, the screen includes a frame, a first screen cloth, a second screen cloth and the solidified layer having perforations therethrough with the solidified layer impregnating the screen cloths to provide a first surface on one side of the screen and a second surface on the other side of the screen. The screen cloths are fixed in tension about the periphery thereof to the frame.

In a second separate aspect of the present invention, the screen of the first aspect further includes a third screen cloth being of intermediate interstices and positioned between the first and second screen cloths. The solidified layer impregnates all three screen cloths.

In a third separate aspect of the present invention, the screen includes a first porous layer including a screen cloth, a second porous layer and a solidified layer having perforations therethrough. The solidified layer impregnates at least a first screen cloth and is textured at the surface of the first screen cloth.

In a fourth separate aspect of the present invention, a process for manufacturing a screen includes layering at least two porous layers and a fusible layer having perforations together. Nonstick sheets are then layered on the foregoing lamination. The resulting lamination is heated and compressed to fuse the fusible layer to impregnate at least one of the two porous layers with the fusible material. The layer is resolidified and the resulting laminated screen structure is tensioned and bonded to a frame.

In a fifth separate aspect of the present invention, the fourth separate aspect may further include the use of two or more screen cloths impregnated by the fusible layer.

In a sixth separate aspect of the present invention, a process for manufacturing a screen includes the layering of at least two porous layers with a fusible layer having perforations therethrough. Nonstick layers are applied to the layered assembly and heating and compressing fuses the fusible layer to impregnate at least one of the porous layers including screen cloth. The fusible material thus defines a surface at the surface of the screen cloth. This surface has a texture molded therein.

In a seventh separate aspect of the present invention, the foregoing aspects are contemplated to be employed in combination to added advantage.

Thus, an object of the present invention is to provide improved screens and a process for the manufacture of improved screens. Other and further objects and advantages will appear hereinafter.

BRIEF DESCRIPTION OF THE DRAWINGS

FIG. 1 is a perspective view of a portion of a screen having a circular frame.

FIG. 2 is a perspective view of a portion of a screen having a rectangular frame.

FIG. 3 is a cross section of a portion of the screens of FIG. 2.

DETAILED DESCRIPTION OF THE PREFERRED EMBODIMENT

Figure 4:
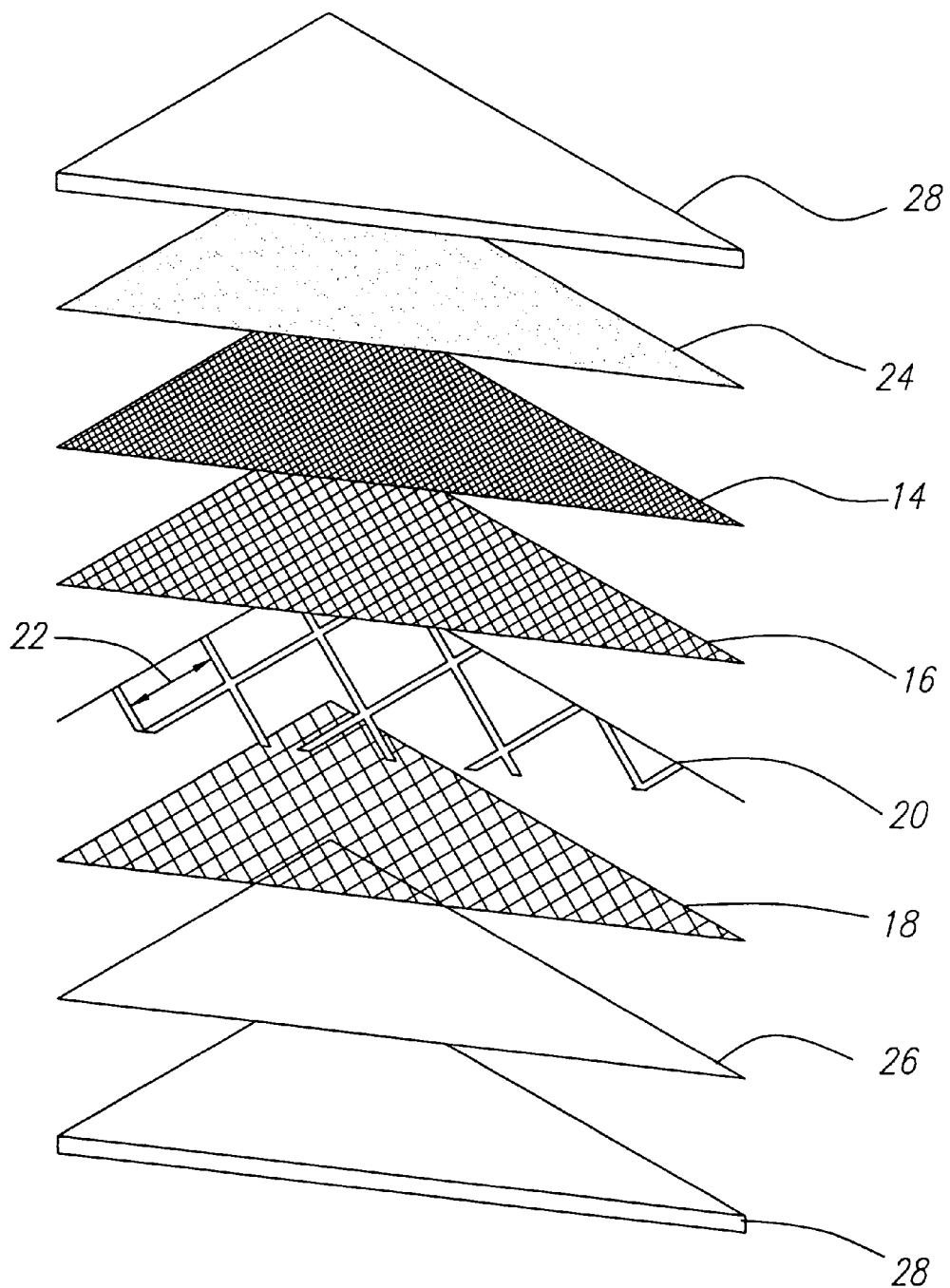
FIG. 4 is a cross-sectional view of the components and heating platens employed in the process of assembly of a screen.

Turning in detail to the drawings, but for the shape of the frame as illustrated in plan, the construction of the drawings of FIGS. 1 and 2 is identical. The frame 10 is shown to be of hollow stainless steel welded construction. Such frames 10 are common in the industry. A conventional adhesive 12 such as an epoxy is employed to bond the screen laminations to the frame 10.

There are typically two or three porous layers employed in the screen assembly. The porous layers illustrated are screen cloth elements 14, 16 and 18. The lowermost, or supporting, porous element 18 may be a rigid plate having perforations therethrough. The screen cloth elements 14, 16 and 18 are of varying mesh size. Typically the finest screen is the screening mesh 14 and the coarsest screen is the support mesh 18. The following illustrate typical examples of screen cloth combinations:

| Screening Mesh | Intermediate Mesh | Coarse Support Mesh |
| --- | --- | --- |
| 325 mesh (0.014" wire dia.) | (not used) | 18 mesh (0.090" wire dia.) |
| 325 mesh (0.0014" wire dia.) | 180 mesh (0.0012" wire dia.) | 20 mesh (0.0162" wire dia.) |
| 84 mesh (0.0025" wire dia.) | 70 mesh (0.0030" wire dia.) | 20 mesh (0.0162" wire dia.) |
| 635 mesh (0.0008" wire dia.) | (not used) | 100 mesh (0.0045" wire dia.) |

Generally, the higher the mesh size, the smaller the interstices. Actual ranges which may be employed for screening mesh 14 can be from 24 mesh (0.0075" wire diameter) to 635 mesh (0.0008" wire diameter). The support mesh layer 18 has a contemplated range from 4 mesh (0.0475" wire diameter) to 100 mesh (0.0045" wire diameter). The intermediate layer of mesh 16, when used, has a contemplated range of from 24 mesh (0.0075" wire diameter) to 635 mesh (0.0008" wire diameter).

A solidified layer 20 is employed with the layered screen cloth. The solidified layer 20 is typically presented adjacent to the support mesh 18. Thus, it is also adjacent to the intermediate mesh 16 when used or the screening mesh 14 when the intermediate mesh 16 is not used. The solidified layer 20 is preferably 0.030" to 0.060" thick polypropylene sheet. Polyethylene sheet may be employed as an alternative. Such fusible materials may also be replaced by materials which cure upon the application of heat. However, for fabrication it is advantageous to have the materials in sheet form for easy placement between the screens. The solidified layer 20 has large perforations 22 therethrough. The perforations are preferably much larger than the connecting elements of the layer 20.

In assembling the foregoing into a screen, heat and pressure are applied to fuse the solidified layer 20 and cause it to be impregnated through the screen cloths 14, 16 and 18. Before this is performed, nonstick sheets 24 and 26 are positioned to either side of the layered components. These nonstick sheets 24 and 26 are preferably made nonstick by PTFE. In the case of the lower nonstick sheet 26, the sheet itself may be PTFE. The upper nonstick sheet 24 in the preferred embodiment is a woven fiberglass matting which is coated with PTFE. The employment of this structure provides a woven texture to the surface of the sheet 24 most adjacent the screen cloth 14.

To complete the laminating of the screening material, a heat press 28 is employed. The heat press 28 provides heating and compression to the layers. The heat press typically bond the assembly at around 500° F. Depending on the laminating material selected, the temperature range is typically between 300° F. and 550° F. In applying heat and compression with the heat press 28, the solidified layer 20 is fused such that the material thereof can impregnate the cloth layers 14, 16 and 18. This impregnation results in the fused material flowing through and defining surfaces at the surfaces of the outermost screen cloth.

The lower nonstick sheet 26 may be plain or textured. When plain, a smooth surface is defined by the fused material. The upper nonstick sheet 24 is textured by the woven fiberglass component. With the heating and compressing, the upper surface created by the fused layer 20 is surface molded with the texture. The same may be true for the bottom of the assembly if the nonstick sheet 26 also is textured.

The fused layer 20 is allowed to resolidify with the textured surface or surfaces. The heat press is removed as are the nonstick sheets 24 and 26. The assembled laminated screening system may then be tensioned and bonded by means of the adhesive 12 to the frame 10. The resulting structure has an upper screening surface which is made up of screen cloth and textured laminating material. Thus, the entire surface of the resulting screen within the confines of the frame 10 is able to impart lateral motion to the material being screened because of the textures of these components.

Thus, improved laminated screens and their manufacture are disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A screen comprising
   a frame;
   a first porous layer fixed in tension about the periphery thereof to the frame and including first screen cloth;
   a second porous layer including second screen cloth having larger interstices than and being layered with the first screen cloth and fixed in tension about the periphery thereof to the frame;
   a solidified layer having perforations therethrough, the solidified layer impregnating the first screen cloth and the second screen cloth.

2. The screen of claim 1 further comprising
   a third porous layer including third screen cloth having interstices larger than the first screen cloth and smaller than the second screen cloth and being between the first and second screen cloths and fixed in tension about the periphery thereof to the frame, the solidified layer impregnating the third screen cloth.

3. The screen of claim 2, the solidified layer impregnating the first screen cloth and the second screen cloth providing a first surface on one side of the screen at the surface of the first screen cloth, the solidified layer being textured at the surface of the first screen cloth.

4. The screen of claim 1, the solidified layer impregnating the first screen cloth and the second screen cloth providing a first surface on one side of the screen at the surface of the first screen cloth, the solidified layer being textured at the surface of the first screen cloth.

5. A screen comprising
   a first porous layer including first screen cloth;
   a second porous layer having larger interstices than and being layered with the first porous layer;
   a solidified layer having perforations therethrough, the solidified layer impregnating the first screen cloth and fixed to the second porous layer, the layer being textured at the surface of the first screen cloth.

6. The screen of claim 5, the second porous layer including second screen cloth and the solidified layer impregnating the second screen cloth.

7. The screen of claim 6 further comprising
   a third porous layer having larger interstices than the first screen cloth and smaller interstices than the second screen cloth and being between the first and the second porous layers and fixed about the periphery thereof to the frame, the solidified layer being fixed to the third porous layer.

8. The screen of claim 7, the third porous layer including third screen cloth and the solidified layer impregnating the third screen cloth.

9. A process for manufacturing a screen, comprising layering at least two porous layers and a fusible layer having perforations therethrough;

heating and compressing the juxtaposed porous layers and fusible layer to fuse the fusible layer and impregnate at least one of the two porous layers with the fusible layer;

resolidifying the fusible layer;

tensioning the layered porous layers and resolidified fusible layer;

bonding the tensioned layered porous layers and resolidified fusible layer to a frame.

10. The process of claim 9 further comprising layering a first nonstick sheet to one side and a second nonstick sheet to the other side of the at least two porous layers and the fusible layer before the heating and compressing:

removing the nonstick sheets after the heating and compressing, one of the nonstick sheets including texture on the side in contact with one of the at least two porous layers and the fusible layer, resolidifying the fusible layer including providing a first surface on one side of the screen at the surface of the first porous layer and molding the texture on the nonstick sheet into the first surface of the resolidifying fusible layer.

11. A process for manufacturing a screen, comprising layering at least two porous layers and a fusible layer having perforations therethrough;

layering a first nonstick sheet to one side and a second nonstick sheet to the other side of the at least two porous layers and the fusible layer, one of the nonstick sheets including texture on the side in contact with one of the at least two porous layers and the fusible layer;

heating and compressing the layered porous layers, fusible layer and nonstick sheets to fuse the fusible layer and impregnate at least one of the two porous layers with the fusible layer;

resolidifying the fusible layer, resolidifying the fusible layer including molding the texture on the nonstick sheet into one surface of the resolidifying fusible layer;

removing the nonstick sheets.

12. The process of claim 11, one of the porous layers being of coarse screen cloth and the other of the at least two porous layers being of finer screen cloth, layering the at least two porous layers and the fusible layer including layering the fusible layer between the one coarse screen cloth and the other of finer screen cloth.

13. The process of claim 12, juxtaposing the nonstick sheets including layering the nonstick sheet including texture on the side in contact with a finer screen cloth.

14. The process of claim 13, the other of the at least two porous layers being a finer screen cloth and a finest screen cloth, layering at least two porous layers and a fusible layer having perforations therethrough further including layering the finer screen cloth between the fusible layer and the finest screen cloth.

* * * * *